United States Patent
Neumann et al.

(10) Patent No.: US 6,242,055 B1
(45) Date of Patent: Jun. 5, 2001

(54) PROCESS FOR MAKING AN ULTRAVIOLET STABILIZED SUBSTRATE

(75) Inventors: Paul Neumann, Louisville, KY (US); Donald P. Hart, Jr., Pittsburgh, PA (US)

(73) Assignee: Universal Woods Incorporated, Louisville, KY (US)

( * ) Notice: Subject to any disclaimer, the term of this patent is extended or adjusted under 35 U.S.C. 154(b) by 0 days.

(21) Appl. No.: 09/351,561

(22) Filed: Jul. 12, 1999

Related U.S. Application Data

(60) Provisional application No. 60/101,870, filed on Sep. 25, 1998.

(51) Int. Cl.[7] .................................................. C08F 2/46
(52) U.S. Cl. .................. 427/493; 427/307; 427/309; 427/325; 427/327; 427/407.1; 427/410; 427/496; 427/506; 427/508; 427/520; 427/551; 427/558; 427/559
(58) Field of Search .................. 427/496, 506, 427/520, 508, 551, 558, 559, 307, 309, 327, 325, 407.1, 410, 493

(56) References Cited

U.S. PATENT DOCUMENTS

| | | |
|---|---|---|
| 4,395,263 | 7/1983 | Davis . |
| 4,738,949 | 4/1988 | Sethi et al. . |
| 5,013,711 | 5/1991 | Egashira et al. . |
| 5,053,382 | 10/1991 | Akada et al. . |
| 5,149,592 | 9/1992 | Wojnarowicz . |
| 5,153,169 | 10/1992 | Freedman et al. . |
| 5,234,983 | 8/1993 | Valenty . |
| 5,354,794 | 10/1994 | Stevenson et al. . |
| 5,371,058 * | 12/1994 | Wittig et al. . |
| 5,387,573 | 2/1995 | Oldfield et al. . |
| 5,405,824 | 4/1995 | Takiguchi et al. . |
| 5,426,088 | 6/1995 | Janssens et al. . |
| 5,427,997 | 6/1995 | Oshima et al. . |
| 5,432,145 | 7/1995 | Oshima et al. . |
| 5,478,629 | 12/1995 | Norman . |
| 5,494,885 | 2/1996 | Kudo et al. . |
| 5,514,637 | 5/1996 | Lum et al. . |
| 5,527,759 | 6/1996 | Oshima et al. . |
| 5,538,831 | 7/1996 | Oshima et al. . |
| 5,545,606 | 8/1996 | Takiguchi et al. . |
| 5,559,077 | 9/1996 | Martin . |
| 5,571,765 | 11/1996 | Van Maele et al. . |
| 5,646,089 | 7/1997 | Oshima et al. . |
| 5,658,848 | 8/1997 | Abe et al. . |
| 5,658,850 | 8/1997 | Taniguchi et al. . |
| 5,686,382 | 11/1997 | Suzuki et al. . |
| 5,710,096 | 1/1998 | Ohnishi et al. . |
| 5,718,792 | 2/1998 | Goode . |
| 5,728,645 | 3/1998 | Oshima et al. . |
| 5,750,240 | 5/1998 | Findley et al. . |
| 5,753,589 | 5/1998 | Takao et al. . |
| 6,054,208 * | 4/2000 | Rega et al. . |

* cited by examiner

*Primary Examiner*—Bernard Pianalto
(74) *Attorney, Agent, or Firm*—Charles G. Lamb; Middleton & Reutlinger

(57) ABSTRACT

A cured coated article and a process for making same includes coating a substrate, such as wood, plastic, high pressure laminates, ceramic or metal with a radiation curable top coat having UV protectable additives therein. The radiation curable top coat is subjected to a curing step which includes curing with either an electron beam, ultraviolet radiation or a combination thereof. A sublimatable ink may be transferred into the top coat.

18 Claims, 1 Drawing Sheet

PROCESS FOR MAKING AN ULTRAVIOLET STABILIZED SUBSTRATE

CROSS-REFERENCE TO RELATED APPLICATIONS

This application is a continuation of provisional patent application No. 60/101,870 filed Sep. 25, 1998.

BACKGROUND OF THE INVENTION

The invention relates to a process for making a substrate capable of accepting sublimatable inks which may be exposed to ultraviolet (UV) light and more particularly relates to an article and a process for making a coated substrate which has been subjected to curing by an electron beam (EB) or ultraviolet (UV) radiation.

It is known in the prior art to transfer sublimatable inks to a coated substrate wherein the inks on the substrate provide designs of selected indicia thereon. The indicia may be in the form of art work, advertisements, slogans and the like. However, after transferring the inks to the coated substrates, in order to protect the indicia from fading over time from ultraviolet radiation, clear films or conventional solvent-borne coatings have been used to cover the indicia coated substrate.

Generally, for the ink sublimation process, a desired design using a sublimatable ink is first printed onto a paper backing sheet by conventional printing techniques. The paperback sheet having the sublimation ink thereon is then transferred under heat and pressure from the backing sheet to the article upon which the design is to be imprinted. After the ink has been transferred to the selected article, such as a wood, ceramic, plastic or the like, the product can be utilized indoors. If fade resistance to UV exposure is required, the product can be coated or a clear film, such as a polypropylene film, is then placed over the ink printed indicia and under heat and pressure is adhered to the ink faced surface.

SUMMARY OF THE INVENTION

It is an object of the present invention to provide a product capable of accepting a sublimatable ink which does not require the addition of a clear film coating over the article after the ink has been transferred thereto in order to be fade resistant to UV exposure.

It is another object of the present invention to provide a process for curing ultraviolet protected coatings which are to receive sublimatable inks thereon.

It is even a further object of the present invention to provide a process for making a printed article including a coating over the article wherein the coating includes compounds therein, such as, for example, benzotriazoles, hindered amine light stablizers and the like, which provide UV protection.

More particularly the present invention is directed to a process for making a cured coated article capable of accepting a sublimatable ink comprising: coating a substrate with a radiation curable top coat having compounds therein which provide UV protection; and, curing said top coat with ultraviolet radiation. A sublimatable ink may then be transferred to said top coat.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENTS

Figure 1:
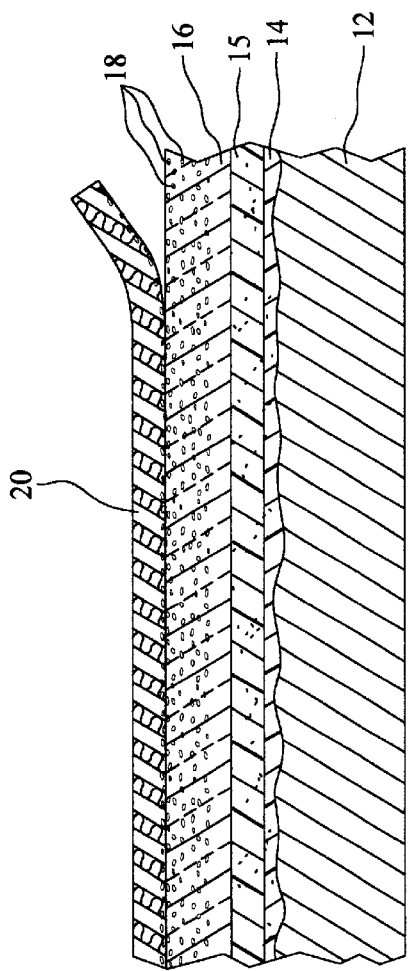
FIG. 1 is a cross-sectional view of a substrate coated according to a process of the present invention showing the transfer of the sublimatable ink from a paper backing; and, FIG. 2 is a cross-sectional view of the substrate of FIG. 1 after the sublimatable ink has been transferred.

As shown in the figures, a material substrate 12, typically a wood, metal, plastic, such as a fiberglass reinforced polyester or a phenolic resin impregnated paper, a high pressure laminate, such as thermally fused paper which may include a plastic, ceramic, or cement board is coated with a UV or EB/UV cured clear topcoat 16 to which a sublimatable ink is applied. Preferably, the substrate is coated first with a filling or sealing coating 14 of a polyester or epoxy acrylate to fill in irregularities of the substrate 12. The optional fill layer 14 is cured with UV radiation with, for example, 8 lamps at 300 watts and a line speed of 65 feet per minute. The substrate 12 is then sanded both to increase smoothness and to provide a better physical bond for subsequent layers.

The filled substrate 12 is then coated with a white layer 15, typically a polyester or urethane acrylate EB or other UV curable product, of 0.2 to 4 mils preferably about 1.5 mils in thickness, and then overcoated with a clear layer or top coat 16. The top coat 16 can be one of a number of clear UV or EB/UV curable products including, but not limited to, polyesters, urethane acrylates, polyester acrylates, and epoxy acrylates as well as cationic cured systems which are well known in the art. These coatings may be formulated with a variety of additives to protect both the coatings and inks from fading due to exposure to sun or other light sources. The top coat 16 will generally be about 2 to 6 mils in thickness but a preferred thickness is of about 2.8 mils. The preferred coating is a urethane acrylate/polyester acrylate blend with additives such as UV absorbers and hindered amine light stabilizers at about a 3% level.

The coated substrate is then cured with an electron beam at from 100 to 500 Kv with preferred settings at 245 KV and 50 milliamps and a line speed of about 90 feet a minute, preferably in an inert nitrogen atmosphere. Alternatively, if a lower gloss is desired, the product is cured with a similar line speed and electron beam settings, but with a mixed nitrogen/oxygen atmosphere, preferably of 94% nitrogen and 6% oxygen. This is followed by a UV cure in an inert atmosphere, such as nitrogen, with 6 lamps at 200 watts and a line speed of 100 feet per minute.

Another curing method includes curing the coating with ultraviolet radiation only. This cure can be carried out in an atmosphere ranging from 0 to 100% air with the balance typically made up of nitrogen. Lamp intensity will usually vary from 200 watts to 700 watts/inch cure systems with a typical setting of 300 watts/inch. If a white layer is utilized, one preferred cure would be with a gallium doped mercury bulb UV system, typically at 300 watts/inch in air. It would typically be sanded after curing prior to the application of the clear top coat or alternatively, the white coat may be slightly undercured to allow for a chemical bond between the two coating layers.

The electron beam or UV radiation treated substrate is now susceptible to the receipt of a sublimatable ink from a paper backed material and is identified in FIG. 1 by the numeral 20. The paper backed material 20 includes the sublimatable ink 18 thereon which is to be transferred to the second or top coat 16. The paper backing 20 with the ink 18 thereon is placed onto the top surface of the top coat 16 with heat and sufficient pressure to hold the backing 20 firmly against the substrate 12. The ink is transferred to the clear top coat 16 usually at from about 350° F. to 400° F.

Figure 2:
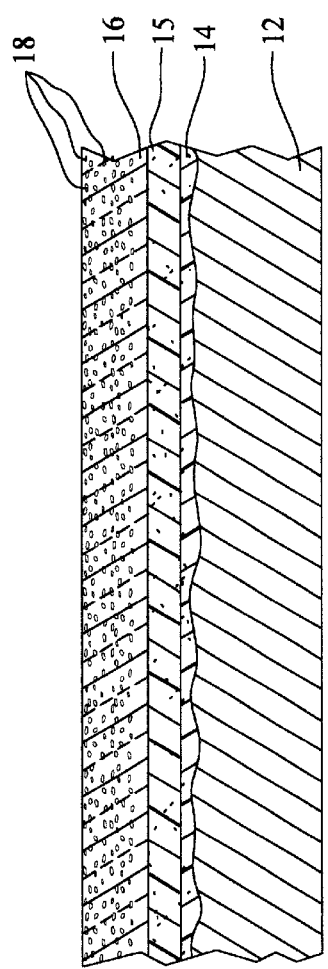

FIG. 2 shows the finished product after the sublimatable ink 18 has been transferred from the paper backing 20. As shown, the sublimatable ink 18 penetrates into the clear coating 16 generally to a sufficient depth so as to be protected against the elements and particularly ultraviolet radiation over prolonged periods of time.

The different articles which may be printed with the sublimatable ink in accordance with the present invention includes plaques of plastic or wood, or high pressure laminated products, cement board, as well as flexible plastic materials and high pressure laminates which may include plastic materials therein for labels, identification badges and the like. Flexible phenolic sheets are generally used as displays, table tops, cabinet doors and the like with selected designs and other type of indicia printed therein.

It is realized that in the explanation of the present invention that first and second coatings are exemplified. However, when the article or substrate 12 is a non-porous type article, a first coating may not be necessary and the clear or second coating (top coat) 16 may be applied directly to the substrate 12.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A process for making a cured coated article comprising:

coating a substrate of wood, plastic, high pressure laminate, ceramic or metal with a radiation curable top coat including compounds which provide UV protection;

subjecting said top coat to a curing step including curing with an electron beam, ultraviolet radiation, or a combination thereof; and, transferring a sublimatable ink to said top coat, said sublimatable ink penetrating into said top coat.

2. The process of claim 1, wherein said transferring includes placing a paperbacked sublimatable ink on said top coat at 350° F. to 400° F. with sufficient pressure to transfer said ink to said top coat.

3. The process of claim 1, said compounds providing UV protection including benzotriazoles, hindered amine light stablizers and mixtures thereof.

4. The process of claim 1, said ultraviolet radiation curing being in an atmosphere of 0 to 100% air with the balance being nitrogen.

5. The process of claim 1 including the step of filling said substrate with a filling compound to form a fill substrate prior to coating with a radiation curable top coat.

6. The process of claim 5 wherein said filling compound is a polyester or an epoxy acrylate.

7. The process of claim 5 including curing of said filling compound with ultraviolet radiation.

8. The process of claim 7 including the step of sanding said cured substrate prior to coating with said radiation curable top coat.

9. The process of claim 5 wherein said coating includes a first coating of said fill substrate with a white coat and a second coating is with said radiation curable top coat.

10. The process of claim 9 wherein said white coat is a polyester acrylate or a urethane acrylate, said white coat being electron beam or ultraviolet curable.

11. The process of claim 9 wherein said white coat is from 0.5 to 4.0 mils in thickness.

12. The process of claim 1, said radiation curable top coat being from 0.2 to 6.0 mils in thickness.

13. The process of claim 12, said thickness being about 2.8 mils.

14. The process of claim 1, said electron beam curing being in an atmosphere of nitrogen.

15. The process of claim 1, said electron beam curing being in an atmosphere of about 94% nitrogen and 6% oxygen.

16. The process of claim 1, said ultraviolet curing being in a nitrogen atmosphere.

17. The process of claim 1, said electron beam curing being at 245 Kv and 50 milliamps.

18. The process of claim 1, said ultraviolet curing being in a nitrogen atmosphere with six lamps at 200 watts and a line speed of approximately 100 feet per minute.

* * * * *